(No Model.)
H. LEMP.
METHOD OF WELDING RINGS BY ELECTRICITY.
No. 428,619. Patented May 27, 1890.
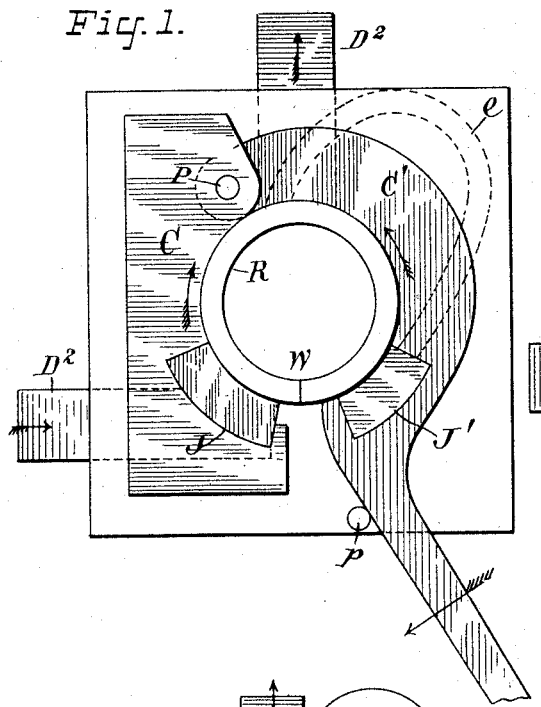
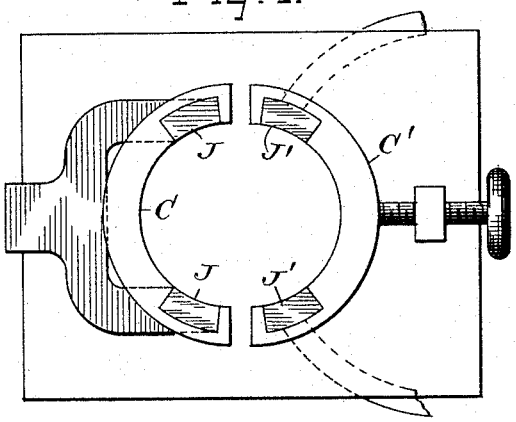
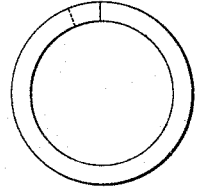
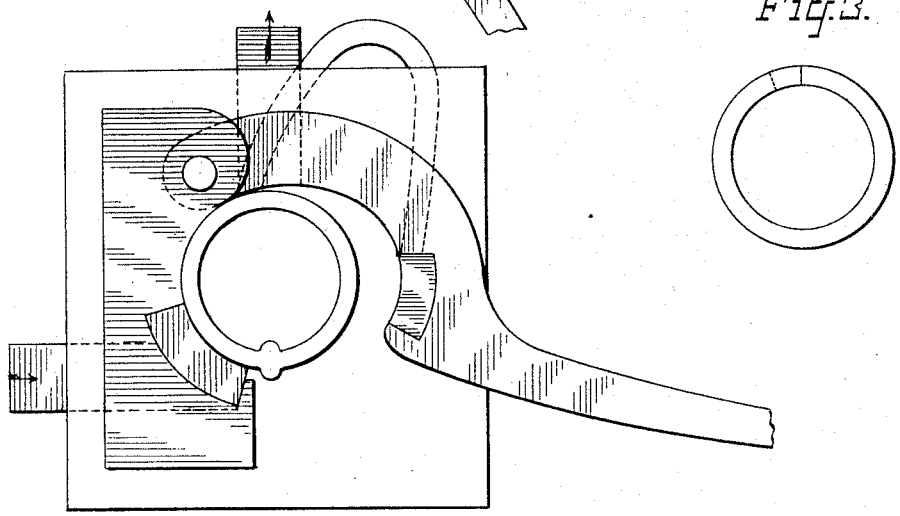
ATTEST:
INVENTOR:
Hermann Lemp.
By H. C. Townsend,
Attorney

UNITED STATES PATENT OFFICE.

HERMANN LEMP, OF LYNN, MASSACHUSETTS, ASSIGNOR TO THE THOMSON ELECTRIC WELDING COMPANY, OF MAINE.

METHOD OF WELDING RINGS BY ELECTRICITY.

SPECIFICATION forming part of Letters Patent No. 428,619, dated May 27, 1890.

Application filed January 10, 1890. Serial No. 336,500. (No model.)

*To all whom it may concern:*

Be it known that I, HERMANN LEMP, a citizen of the United States, and a resident of Lynn, in the county of Essex and State of Massachusetts, have invented certain new and useful Improvements in the Method of Making Rings and other Curved Metal Objects by the Electric Welding Process, of which the following is a specification.

My invention relates to a manner of making metal rings or other metal objects of curved outline and having an open center, in which the electric welding process is employed for the purpose of forming a union between the free ends of one continuous piece of metal, or between the two pairs or more of the free ends of a number of pieces, which, being all welded together, make the complete article of curved or endless form.

The object of my invention is to facilitate the operation of producing the finished article of the required shape; and the invention consists, essentially, in molding or conforming the metal to the required outline or shape simultaneously with the operation of forming the weld or joint electrically between the parts which require to be united in order to make the finished article.

My invention is especially applicable to the making of rings, though it may be applied to the making of curved metal objects of irregular or unsymmetrical form.

The invention consists, likewise, in softening the continuous portion of the metal blank used in making the object by causing an electric current to pass through the same in sufficient volume, thereby assisting in the conforming or molding process.

My invention consists, further, in other details of operation to be hereinafter described, and then particularly specified in the claims.

In practicing my invention any desired form of apparatus may be used which will serve to accomplish the purpose of conforming or molding the object to the desired shape at the time that the parts of the same required to be welded together are forced toward one another, and I have in the accompanying drawings shown but one of many forms of devices which might be employed for the purpose.

In the accompanying drawings, Figure 1 is a plan of an apparatus suitable for practicing my invention, the parts being shown in position preparatory to the operation of welding and molding. Fig. 2 shows the apparatus opened out for the removal of the finished article. Fig. 3 is a blank adapted to be used in forming a metal ring. Fig. 4 illustrates a modified form of apparatus suitable for use in practicing the invention.

Referring to Fig. 1, C C' indicate two jaws whose interior faces, when they are brought together to the proper extent, will conform to the shape of the ring or other finished article. One of the jaws, or both, may be movable and may be mounted on a suitable plate or base adapted to receive the work. I have shown the jaw C as fixed and the jaw C' as movable to and from it, for which purpose it is pivoted at a point, as P, and is provided with a suitable operating-handle or other device. A stop $p$ limits the movement of the jaw C' toward C.

R is the metal ring or blank, the free ends of which are to be welded together at W to form a finished ring.

At J J', I have indicated conducting-blocks of copper or other good conducting material adapted to bear upon the ring at opposite sides of the weld W, for the purpose of furnishing an electric current to the metal of the ring in a way to cause the current to pass across the point W, where the free ends of the blank are abutted.

The blank itself in the present instance is shown as consisting of a single piece of metal, the two free ends of which have been curved around to the general shape of the desired article, and have been made to abut. In forming this blank or ring I may, if desired, take a piece of metal somewhat longer than the circumferential extent of the finished ring and bend such blank into the form of the ring, with its ends, however, overlapping, as illustrated in Fig. 3. The extent of the overlap is determined by the extent of metal which is taken up in the welding process when the two ends are forced together. After forming the blank in the shape shown in Fig. 3 the two ends may be sprung apart and abutted, as indicated in Fig. 1, when the blank is placed in the apparatus. This method of making the blank has the advantage that very little conforming or shaping of the metal is required, especially if the material be springy and adapted to resume its shape after having been sprung to permit the overlapped ends to abut. Even when, however, the blank is of springy metal the conforming or molding operation is desirable, because it insures the production of a finished ring of exact circular outline.

It is obviously not necessary to the carrying out of my invention that the blank should be formed to the exact shape of the finished ring; but I might take a piece of metal and bend it to a general circular form or to a form approaching that of the finished article, bringing the ends of the same together in abutment at the time of first bending. It is generally preferable, however, to make the curved blank on a form which is the same as that of the finished article and to spring the ends back for abutment.

The conducting-blocks J J' of copper may be, and are preferably, mounted in the jaws C C', the faces of the blocks J J' being a part of the conforming or molding surfaces. Electric current may be supplied to such blocks through any desired means. Thus, for instance, the block J may be mounted on a copper bar $D^2$, and the block J' may be supplied through a flexible conductor $e$, connected with another block or bar $D^2$. Electricity from any source supplying current of the requisite volume for heating the metal to be worked to the welding temperature is furnished to the bars D $D^2$, as well understood in the art. The conforming-jaws C C', excepting at the parts J J', are preferably of iron or some inferior conductor, and should be insulated from one another at the point P.

To assist in the operation of conforming or molding the article to the desired shape, I make the faces of the blocks J J' of sufficient angular extent to cause a considerable part of the electric current to pass around by way of the continuous portion of the ring R, and in such amount as to soften the same and render it easy of bending or shaping.

It is obvious that in the case of blanks formed of a single piece of metal the angular extent of the blocks J J' in the direction around toward the continuous portion of a ring or blank will determine the amount of current so passing for the purpose of softening the metal. The amount of current so passing would to some extent be determined also by the nature of the jaws or conforming faces C C', if the latter are inferior conductors. If they were of insulating material entirely, the blocks J J' would have to be continued around or extended to a greater distance for the purpose of softening the blank than would be the case if the jaws C C' were conductors.

While I have described my invention as applied to the making of rings from a single piece of metal bent to the general outline of the ring, it is obvious that it might be carried out by making the ring from two or more pieces. Thus, for instance, as indicated in Fig. 4, each jaw C C' might have two sets of conducting-blocks J J' instead of one, and one jaw might be forced toward the other by means of a screw, as indicated, being for that purpose mounted in suitable guides. Each piece of metal from which the ring is formed would in such case embrace a little more than a half of the completed ring to allow for the part taken up in welding.

After forming the blocks or blanks in any desired manner and making them of a shape approaching or exactly answering to the shape of the finished article the object or objects are placed in the apparatus, as indicated in Figs. 1 and 4, with the ends of the portions to be welded in abutment. The electric current is then supplied to the apparatus, as well understood in the art, and being caused to pass across the joint the parts contiguous to the joint are softened and heated to a welding temperature, whereupon the parts are forced toward one another by means of the devices shown, thus causing them to be welded together with (in ordinary cases) simultaneous formation of a burr or expansion, as indicated in Fig. 3, which burr or expansion represents the amount of metal taken up in the welding operation and allowed for by making the blank which is placed in the apparatus somewhat longer than would be necessary if no metal were used at the weld.

When the objects are forced toward one another for the purpose of forming a weld, as just mentioned, the conforming or molding devices C C', being moved toward one another at the same time, will shape or mold the ring to the exact finished form which it will assume when the parts have reached the limit of their movement, as determined by the stop $p$ or other device.

As before stated, while I prefer to cause current to pass through the continuous portions in volume sufficient to soften the same, I do not confine myself to this expedient, and in the case of rings or other objects formed of metal of small gage, or of a metal which is naturally plastic, I may omit the softening of the blank or blanks by heat produced by the current.

What I claim as my invention is—

1. The herein-described improvement in welding metal rings or other curved metal objects, which consists in causing the electric current to pass through the continuous portion of the blank in amount sufficient to soften the same, and molding or conforming such continuous portion to the curve required simultaneously with the welding operation.

2. The herein-described method of forming rings or other endless metal objects having an open center, consisting in bending a bar of metal of a length greater than the circumferential length of the desired finished article until its ends overlap, springing the ends apart and abutting them, and then electrically welding said ends together, while at the same time molding the continuous portion of the bar to the exact conformation desired.

3. The herein-described improvement in making electrically-welded rings, which consists in forming a curved blank from a continuous piece of metal of somewhat greater length than the circumferential length of the finished ring, placing the free ends of the blank in abutment in an electrical welding apparatus, and then forcing them toward one another to effect the weld, while at the same time shaping or molding the other portions of the blank to the desired curve or form.

4. The herein-described improvement in forming rings or other curved metal objects by the electric welding process, consisting in molding or shaping the continuous parts of the object to the finished form in the operation of forcing the parts to be welded toward one another.

5. The herein-described method of forming electrically-welded rings, consisting in bending a bar or piece of metal into a curve with its ends overlapping to the extent required for the weld, springing the ends apart and abutting them against one another, and then forcing such ends toward one another while heated by the electric current, and at the same time molding the metal to the shape of the finished ring.

6. The herein-described method of electrically welding rings or other curved objects, consisting in bending a rod or bar of metal into the general shape required, abutting the ends against one another, passing an electric current across the joint, and then forcing the ends toward one another, while at the same time molding the metal to the shape of the finished article desired.

Signed at Lynn, in the county of Essex and State of Massachusetts, this 7th day of January, A. D. 1890.

HERMANN LEMP.

Witnesses:
JOHN W. GIBBONEY,
F. W. CUSHING.